Figure 1:
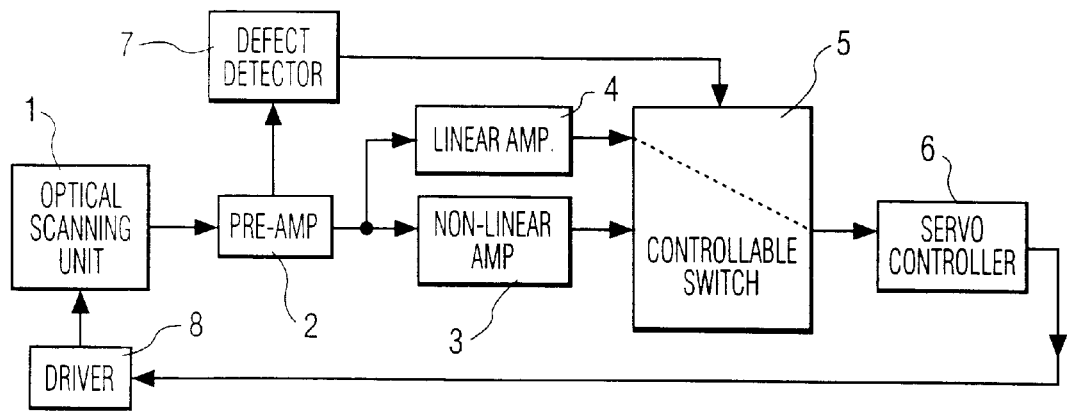

United States Patent
Takagi et al.

[11] Patent Number: 6,046,967
[45] Date of Patent: Apr. 4, 2000

[54] RECORDING OR PLAYBACK DEVICE FOR OPTICAL INFORMATION CARRIERS HAVING A SERVO CONTROL CIRCUIT AND METHOD FOR TREATING ERROR SIGNALS IN SUCH A DEVICE

[75] Inventors: Hirohito Takagi, Chiba, Japan; Friedrich Fueldner, Villingen-Schwenningen; Volker Politz, Isen, both of Germany

[73] Assignee: Deutsche Thomson-Brandt GmbH, Villingen-Schwenningen, Germany

[21] Appl. No.: 08/942,765

[22] Filed: Oct. 2, 1997

[30] Foreign Application Priority Data

Oct. 4, 1996 [DE] Germany ............... 196 40 870

[51] Int. Cl.⁷ ...................................... G11B 7/00
[52] U.S. Cl. .................. 369/44.35; 369/44.26
[58] Field of Search ................ 369/32, 44.27, 369/44.28, 44.29, 44.34, 44.35, 44.26, 124

[56] References Cited

U.S. PATENT DOCUMENTS

| | | | |
|---|---|---|---|
| 4,674,076 | 6/1987 | Hsieh et al. | 369/44.29 |
| 4,937,803 | 6/1990 | Nakane | 369/43 |
| 4,967,404 | 10/1990 | Orlicki et al. | |
| 5,136,561 | 8/1992 | Goker | 369/44.28 |
| 5,343,459 | 8/1994 | Roesinger et al. | |
| 5,406,536 | 4/1995 | Doi | 369/44.28 |
| 5,432,473 | 7/1995 | Mattila et al. | |
| 5,434,454 | 7/1995 | Watanabe et al. | |
| 5,768,227 | 6/1998 | Baba | 369/44.34 |
| 5,796,688 | 8/1998 | Gage et al. | 369/44.35 |

*Primary Examiner*—Nabil Hindi
*Attorney, Agent, or Firm*—Joseph S. Tripoli; Peter M. Emanuel; Paul P. Kiel

[57] ABSTRACT

Recording or playback devices for optical recording carriers have a servo control circuit which controls the tracking and the focus of an optical scanning unit 1 with reference to an error signal. According to the invention, the error signal is non-linearly amplified upstream of the servo controller, in order to process strong external mechanical effects, normally referred to as shocks, in such a way that the tracking and the focus are retained or adjusted. If there is a defect, such as a scratch on the disc etc., a defect detector and a linear amplifier connected in parallel with the non-linear amplifier are additionally used, the linearly amplified or non-linearly amplified error signal being fed to the servo controller as a function of the output signal of the defect detector. The sign of the error signal, which includes direction information, is retained in the case of the non-linearly amplified error signal.

12 Claims, 1 Drawing Sheet

RECORDING OR PLAYBACK DEVICE FOR OPTICAL INFORMATION CARRIERS HAVING A SERVO CONTROL CIRCUIT AND METHOD FOR TREATING ERROR SIGNALS IN SUCH A DEVICE

The invention relates to a recording or playback device for optical information carriers having a servo control circuit and a method for treating an error signal in the servo control circuit. In particular, the invention relates to the servo control circuit of a recording or playback device for optical information carriers which is capable of compensating for a mechanical shock and to a method for compensating a mechanical shock.

Recording and playback devices for optical information carriers have servo control circuits in order to compensate for deviations or errors such as tracking errors and/or focus errors, the error signals being derived from measured values of an optical scanning unit and processed in a servo unit to form control signals and these control signals being fed to the actuators of the optical scanning unit. The term error signal is understood below as the error signals, i.e. focus error signals and/or tracking error signals, etc., which have already been referred to. Recording or playback devices for optical information carriers are for example CD players, magneto-optical recording and/or playback devices, CD-ROM players, video disc recording and/or playback devices etc. Error signals have different causes such as for example slight curvature of the optical disc, slight inclination of the disc with respect to the drive axis etc. Furthermore, error signals are caused by shocks, a shock signifying an undesired sudden movement of the recording or playback device, that is to say being a mechanical event.

A known servo control circuit (illustrated in FIG. 3) of a recording or playback device has different amplifiers for the error signal. In the present case, three amplifiers are provided which are used depending on the state of the recording or playback device. Thus, during normal operation, the error signal path is switched to a first amplifying means, if defects are detected it is switched to a second amplifying means and for shock compensation it is switched to a third amplifying means. In order to detect defects such as black dots or scratched discs for example, a defect detector is used which acts on a change-over switch between the amplifiers. The shock which is a sudden movement of the housing is detected by a specific shock detector, which, in addition to the defect detector, also acts on the switching over of the amplification means. Such a shock detector requires a certain time of approximately 1 to 2 ms in order to detect the shock. Owing to this delay, the servo circuit, i.e. the servo controller, is not sufficiently robust with respect to the shock, since the control voltage of the shock detector is not available, for example, until the shock is already past.

In addition, U.S. Pat. No. 4,475,182 discloses a focus servo control system for automatically setting a relative distance between an objective lens and a recording surface of an optical recording medium, the optical scanning unit having a four-quadrant sensor and generating a focus error signal by means of a differential amplifier. In order to compensate for relatively intensive external disturbances, i.e. shocks, the error signal is amplified in an appropriate amplifier upstream of the servo controller, the gain factor of the amplifier being controlled by a gain controller. This gain controller increases the gain of the amplifier as a function of the increase in the error signal. Although the necessity of a shock detector is obviated with this known device, strong mechanical effects on the device are not sufficiently compensated owing to the limitation of the gain, wish the result that the method does not function sufficiently reliably in the case of portable devices.

Therefore, the invention is based on the object of providing a servo control circuit for controlling the scanning unit of a recording or playback device and a method for treating error signals in such a device, so that the device is essentially insensitive to external mechanical effects.

The object is achieved with features specified in main claims. Preferred refinements of the invention are the subject-matter of the subclaims.

The present invention relates to a method for treating error signals in a servo control circuit of a recording or playback device for optical information carriers, the method having the following steps: derivation of an error signal, in particular of a tracking error signal and/or focus error signal, from the measurement signals of an optical scanning unit, non-linear amplification of the error signal, and derivation of a control signal from the non-linearly amplified error signal in order to control a corresponding actuator of the optical scanning unit. Preferably, the sign of the error signal is added to the non-linearly amplified error signal, since the sign includes direction information. The non-linear treatment of the error signal can be brought about by squaring the error signal. Other non-linear amplification functions are possible and are selected as a function of the required, non-linearly amplified error signal.

Furthermore, the present invention relates to a servo control circuit in a recording or playback device with an optical scanning unit for generating information signals, including error signals, in particular focus error signals and/or tracking error signals, an amplification unit and a servo controller, the amplification unit having a non-linear behavior for the generation of a non-linearly amplified error signal.

In addition, the amplifier unit of the servo control circuit according to the invention provides the non-linearly amplified error signal with the sign of the error signal. The servo control circuit according to the invention also contains a pre-amplifier for generating the error signal. In order to speed up the computation process and simplify the circuit, the non-linear amplifier can be formed with a look-up table. This advantageously permits a simple adaptation of the circuit to the purpose of use, permitting another, appropriately adapted amplification function to be achieved with another look-up table.

The non-linear amplifier can also be formed with a multiplier which squares the error signal, the sign of the error signal being added to the squared error signal, bypassing the multiplier, in a sign unit of the non-linear amplifier.

In addition, the servo control circuit according to the invention advantageously contains a defect detector and a linear amplifier for linearly amplifying the error signal, the error signal being amplified linearly when a defect has been detected. In addition, the servo control circuit has a switch which switches between the linearly and non-linearly amplified error signal as a function of the output signal of the defect detector, so that the corresponding linearly or non-linearly amplified error signal is fed to the servo controller.

Furthermore, the servo control circuit has a driver which drives the optical scanning unit as a function of the control signal of the servo controller.

The system or method according to the invention for shock compensation in recording or playback devices for optical recording carriers advantageously does not have its own shock detector, so that the cost thereof is consequently avoided. In addition, the system or method also operates at shocks which are large in terms of amplitude, since the disturbance is counteracted to a greater degree even during the actual occurrence of the shock. Owing to the non-linear amplification behavior, the control signal of the controller is sufficient to compensate even large tracking deviations, in other words the invention provides good tracking control or a "robust" controller. In addition, in the case of a digital servo controller the invention can be handled easily and can easily be adapted to the corresponding use, for example by adapting the non-linear amplification function to external conditions by changing the coefficients of a look-up table.

Figure 2:
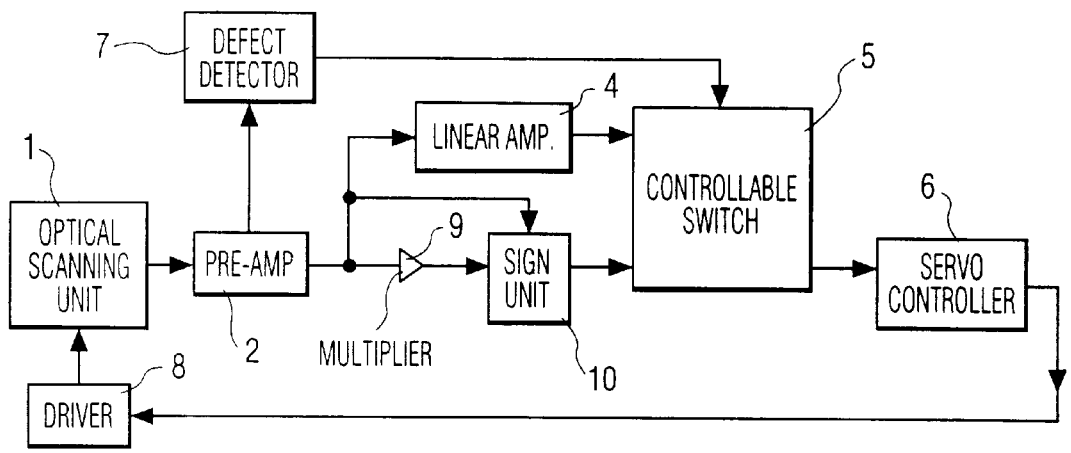
Figure 3:
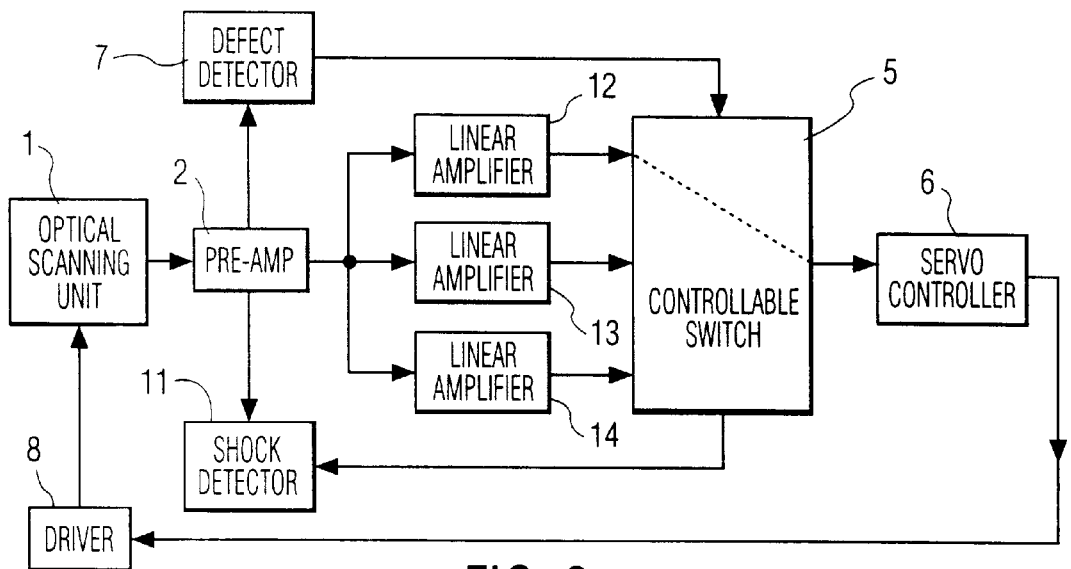

The invention is described in more detail below with reference to the figures in which:

FIG. 1 shows a block diagram of a servo control circuit according to the invention, FIG. 2 shows the block diagram of a further embodiment according to the invention, and FIG. 3 shows the block diagram of a conventional servo control circuit.

FIG. 1 shows the block circuit diagram of a servo control circuit according to the invention, in which an optical scanning unit 1 optically reads or writes to a corresponding optical disc (not illustrated), and reconstructs from read signals not only the optical information, for example audio information, of the disc, but also a corresponding error signal is generated from the measured values in a corresponding pre-amplifier 2 or signal-conditioning unit 2 at its output. This error signal is amplified by means of a non-linear amplifier unit 3, the non-linear error signal at the output of the non-linear amplifier 3 again having the same sign as the error signal, in other words the sign is retained. A linear amplifier 4 is connected in parallel with the non-linear amplifier 3. The outputs of both the linear amplifier 4 and the non-linear amplifier 3 lead into a controllable switch 5 by means of which a selection is made to determine which of the two error signals, specifically either the non-linearly amplified error signal or the linearly amplified error signal, is fed to a servo controller 6. The controllable switch 5 is controlled by a defect detector 7. The defect detector 7 is connected to the pre-amplifier 2 and decides, depending on the signal of the pre-amplifier 2, whether there is a defect on the disc or not. If there is a defect, such as for example scratches or black marks on the optical disc, the linearly amplified error signal is transmitted to the servo controller 6. If there is no defect, i.e. either during normal operation or when the device is subjected to a mechanical shock, the non-linearly amplified error signal is transmitted to the servo controller 6. The servo controller 6 makes available, in a known manner, control output signals which control the actuators (not illustrated) of the optical scanning unit 1 by means of a driver 8. In the case of a digital implementation of the circuit, appropriate A/D and/or D/A converters also have to be provided in a known manner. In the digital case, the non-linear amplifier 3 can be implemented by means of a look-up table. It is also possible to implement it as a multiplier.

FIG. 2 shows a preferred embodiment of the servo control circuit in accordance with the invention, in which the non-linear amplifier 3 has a multiplier 9 such that the square of the error signal which is input into the multiplier 9 is formed. Since the sign of the error signal contains direction information for the optical scanning unit 1, the sign, or the error signal associated with the sign, is transmitted in parallel between the pre-amplifier 2 and the multiplier 9, bypassing the latter, into a sign unit 10 which restores the original sign to the squared or non-linear error signal. The rest of the circuit is identical to the circuit corresponding to the block diagram in FIG. 1, so that there is no need for further explanations.

FIG. 3 shows a block diagram of a conventional servo control circuit in which identical components are provided with identical reference symbols. The known circuit has, in addition to the defect detector 7, a shock detector 11 which detects the presence of a mechanical shock from the signals of the pre-amplifier 2. The error signal generated downstream of the pre-amplifier 2 is transmitted into the linear amplifiers 12, 13 and 14 which are connected in parallel. In this case, the amplifier 12 amplifies the error signal with a proportional gain, which is suitable for a defect, the amplifier 13 amplifies the error signal with a gain factor with normal proportionality for normal operation, and the amplifier 14 has a greater linear gain, which is suitable for processing shocks. The controllable switch 9 is appropriately controlled both by the defect detector 7 and by the shock detector 11, so that the signal which corresponds to the situation is present at the output of the controllable switch 5 at the servo controller 6.

We claim:

1. In a recording or playback device for optical information carriers having an optical scanning unit providing via an amplifier a tracking error signal or focus error signal for a servo controller and a defect detector indicating a defect on the optical information carrier, a method for treating error signals in a servo control circuit, the method comprising the steps of:

deriving an error signal, in particular a tracking error signal or a focus error signal, from the measurement signals of the optical scanning unit;

amplifying the error signal in a linear manner and in a non-linear manner;

applying the non-linearly amplified error signal to the servo controller during normal play and in response to mechanical shocks; and applying the linearly amplified error signal to the servo controller in response to an output signal of the defect detector indicating a defect on the optical information carrier.

2. Device according to claim 1, characterized in that the non-linear amplification step includes adding the sign of the error signal to the non-linearly amplified error signal.

3. Device according to claim 1, wherein the amplifying step includes non-linearly amplifying the error signal by multiplying the error signal by itself.

4. Recording or playback device for optical information carriers, the device comprising:

a servo controller;

an optical scanning unit providing, via an amplifier unit, a tracking error signal or a focus error signal to the servo controller;

an amplifier unit providing a non-linearly amplified error signal and a linearly amplified error signal to the servo controller; and a defect detector for providing an output signal which indicates a defect on the optical information carrier; and a switch means, coupled to the amplifier unit, for applying one of the linearly amplified and non-linearly amplified error signals to the servo controller in response to the output signal of the defect detector, the linearly amplified error signal being applied to the servo controller when the output of the defect detector indicates a defect on the optical information carrier.

5. Device according to claim 4, wherein the amplifier unit has a sign unit in order to provide the non-linearly amplified error signal with the sign of the error signal.

6. Device according to claim 4, wherein the servo control circuit has a pre-amplifier for generating the error signal.

7. Device according to claim 4, wherein the non-linear amplifier comprises a look-up table which defines a non-linear amplification function.

8. Device according to claim 4, characterized in that the non-linear amplifier comprises a multiplier which multiplies the error signal by itself.

9. Device according to claim 8, characterized in that the non-linear amplifier (3) contains a sign unit (10).

10. Device according to claim 5, wherein the non-linear amplifier has a look-up table which defines a non-linear amplification function.

11. Device according to claim 5, wherein the non-linear amplifier is a multiplier which multiplies the error signal by itself.

12. Recording or playback device for optical information carrier, the device comprising:

- an optical scanning unit providing a tracking error signal or a focus error signal;
- amplifier, coupled to said optical scanning unit, for amplifying the tracking error signal or the focus error signal in a linear manner and in a non-linear manner;
- a defect detector, coupled to the optical scanning unit, providing an output signal indicative of a defect on the optical information carrier;
- a switch, coupled to the amplifier, which switches between the linearly and the non-linearly amplified error signals in response to the output signal of the defect detector; and
- a servo controller, connected to the switch means, for providing a control signal to the optical scanning unit in response to the linearly or non-linearly amplified error signals, for compensating mechanical shocks.

* * * * *